May 21, 1946.　　　F. D. PRAGER　　　2,400,598
LIQUID TREATMENT
Filed Feb. 4, 1942
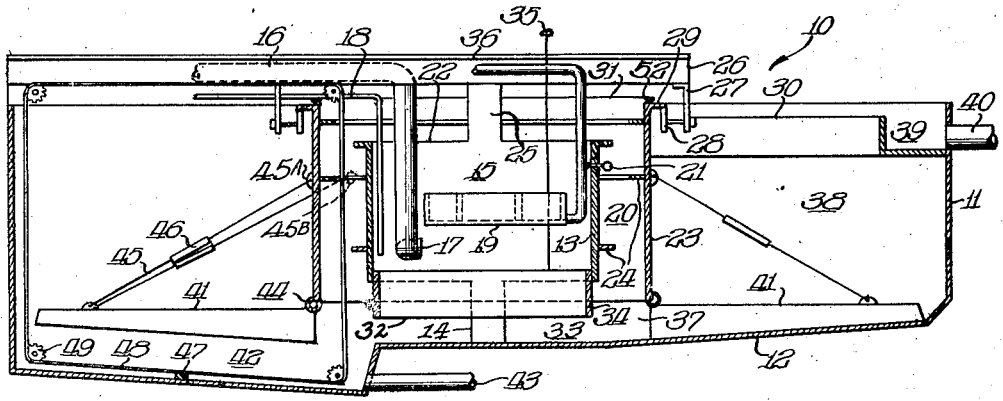
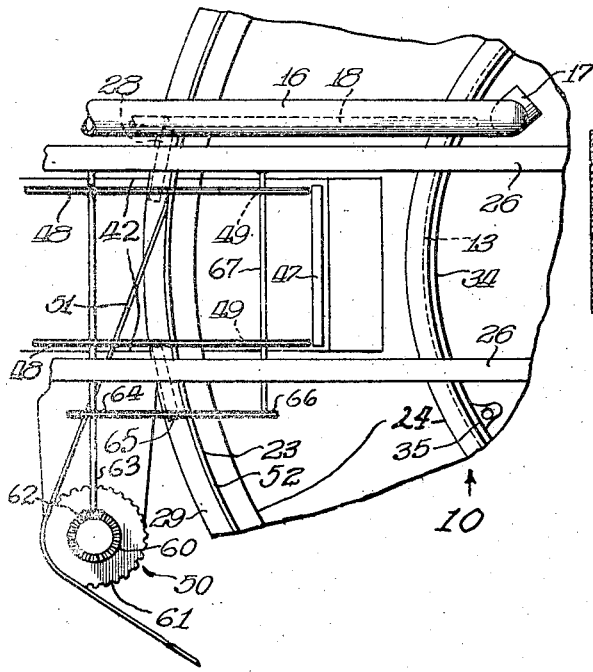
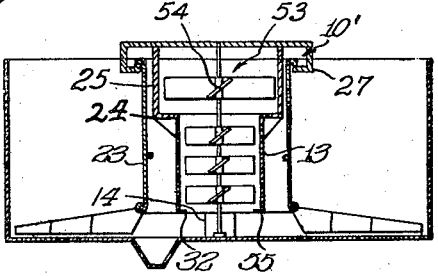
INVENTOR.
Frans D. Prager Patented May 21, 1946

2,400,598

UNITED STATES PATENT OFFICE 2,400,598

LIQUID TREATMENT

Frank D. Prager, Chicago, Ill., assignor to Graver Tank & Mfg. Co., Inc., a corporation of Delaware Application February 4, 1942, Serial No. 429,465

7 Claims. (Cl. 210—26)

This invention relates to liquid treatment in tanks having a plurality of concentric chambers for mixing, coagulating and clarifying. The liquids contemplated include water, sewage and other aqueous mixtures.

It is an object of this invention to provide a clarification tank with a central partition forming a hollow pier for the elevated support of rotatable sludge scrapers, to establish communication between the inside of this hollow pier and a surrounding tank space, at an upper and at a lower point within the tank, and to utilize the inside of the hollow pier, between said points, as a sludge recirculating chamber. I support the sludge scrapers from the pier by means of, or together with, a pier-encircling, drum-shaped partition wall which reaches from above the liquid level to adjacent said lower point, and I utilize this drum, as well as the pier, for sludge recirculation. It is a particular object to recirculate the sludge upwardly through the pier and downwardly through the drum, with subsequent upward flow and sludge filtration of the liquid passing to an upper, peripheral outlet in the tank.

From another standpoint it is an object hereof to provide a clarification tank with a pair of central, concentric partitions forming sludge recirculating chambers for the flow of sludge in opposite directions, rigidly to support the inner one of said pair of partitions from the tank bottom, and rotatably to support the outer partition from the top of the inner one, with a system of scrapers for the removal of sludge from various points in said tank, a single structure serving conveniently to support the outer partition and the scraper system.

Still another object is to provide a clarification tank with a pair of concentric partitions forming sludge recirculating chambers for the flow of sludge in opposite directions, to produce liquid acceleration and upward sludge recirculation in one of said chambers, and to enforce numerous successive, mild liquid decelerations in a downward flow throughout the other of said chambers by annular baffles installed therein. In this connection, special objects are, to install such annular baffles upon said partitions so that the baffles also serve as structural braces of the partitions; and furthermore, to install such annular baffles on the inside of a rotating drum, and the outside of a stationary pier, as aforesaid.

These and other objects will be clearly understood on consideration of the detailed disclosure given herein. In the drawing:

Figure 1 is a sectional elevation of apparatus constructed according to this invention;

Figure 2 is an enlarged plan view of details generally shown in Figure 1, with the walkway removed; and Figure 3 is a sectional elevation of a modified embodiment of my invention.

The treatment tank 10 is confined by a circular wall 11 and bottom 12. Concentrically disposed in the tank there is a cylindrical or annular partition wall or hollow center pier 13 resting on the bottom 12 and spaced from this bottom by supporting legs 14. These legs stand on the bottom 12, being secured thereto by suitable anchor bolts or the like, not shown. This pier encircles a central mixing chamber 15 which receives raw liquid from an inlet pipe 16 through a tangential inlet 17 adjacent the bottom 12. Chemical reagents are supplied to the liquid in the mixing chamber through a feed pipe 18. The volume of the mixing chamber may be sufficient to hold the liquid flow of about five minutes, more or less, depending on local conditions and requirements. While the liquid flows upwardly through the mixing chamber it is agitated by columns, sheets, or streams of compressed air introduced at a suitable elevation above the bottom 12, through a distributor 19 covering a suitable part of the mixing chamber area, and creating a positive head of a few fractional inches in this chamber. Such agitation, together with that effected by the liquid flow itself, causes desirable distribution and mixture of the liquid and the chemical reagents over the whole area of the mixing chamber, and collisions between liquid and solid bodies throughout the flow. The area of the mixing chamber and the velocity of the liquid therein are so selected that the air bubbles may rise rapidly through this liquid, accelerating certain liquid portions relative to the surrounding liquid in the mixing chamber. Similarly, the flow entering through the inlet 17 accelerates the liquid in the mixing chamber while losing some of its own velocity head. Wherever such acceleration or deceleration occurs the conditions are favorable for the coagulation of flocs. Such coagulation starts in the mixing chamber. It continues in the subsequent downflow or coagulation chamber 20 which forms a hollow column around the central mixing chamber, in manner to be described hereafter, and, which may have volume to hold the flow of 10 minutes, more or less.

When referring to coagulation I mean the process that occurs on liquid agitation in the presence of proper chemicals and which promotes the formation of solid particles, which particles, then, are present along with the liquid and chemicals. Such particles may be called coagulates or precipitates, or simply flocs, the processes being fully analogous to one another in both cases. I also contemplate that in such chambers sedimentation tends to occur and may well be allowed to a limited extent, since solids moving down through the liquid contribute to the gentle agitation desired; however, a complete deposition and accumulation of the sludge is not desirable in such a chamber, and is prevented by means to be discussed later. It will be understood, then, that the coagulation treatment as contemplated herein can also be called a treatment for precipitation, or partial sedimentation.

Separate means for slow stirring such as small air distributors 21 connected to the supply pipe of the main distributor 19, may be installed in the downflow chamber or coagulation zone 20; but generally the after effects of treatment in the mixing chamber are sufficient to cause the kind and degree of agitation that is desirable here. While the mixing zone 15 conveniently provides acceleration of the bulk of the liquid, it is more convenient in this subsequent zone 20 to cause continued agitation and coagulation by deceleration of the bulk of the liquid. For this purpose I cause the liquid to turn abruptly over the upper edge 22 of the inner wall 13, to expand in the downflow chamber 20 between this inner wall and an outer drum 23 confining the downflow chamber, and to flow between baffles 24 in this downflow chamber.

The pier or inner wall 13 rotatably supports the outer drum 23; there being arms 25 upwardly extending from the wall 13, a superstructure or bearing support means 26 supported by those arms, brackets 27 depending from the superstructure, bearing means in form of rollers 28 carried by the brackets, and a horizontally disposed, horizontally rotatable ring 29 resting on the rollers and supporting the drum 23; the bearing support means 26 being a structure horizontally extending above the pier 13, and the bearing means or rollers 28 being disposed in a horizontal plane. The top edge 22 of the inner wall 13 is located below the liquid level established by an outlet overflow weir 30 outside the mixing and downflow chambers; whereas the top edge 31 of the outer drum and the roller supports 28 are above the liquid level. Accordingly the open spaces left between and defined by the arms 25 may be designated as a set of flow passages between the zones 15 and 20.

The decelerating baffles 24 in the downflow chamber are annular, horizontal, vertically spaced from one another and installed at a plurality of points distributed substantially throughout the zone 20. Some of them are secured to the inner wall 13, and similar baffles are secured to the drum 23 below the liquid level, between the baffles on the inner wall, so that the liquid alternately impinges on the upper sides of inner and outer baffles, converging and diverging around the same, as it flows downwardly through the chamber 20. These baffles are so arranged as to cause further expansion of the flow in the downflow chamber 20. If no baffles were interposed the liquid which is no longer accelerated would tend to assume motion according to the laws of laminar flow, before it comes to rest entirely. As the flow is deflected by the baffles 24 and turns around the same, new eddies are formed, at least some of the kinetic energy in the most rapid flowing liquid portions is absorbed by inner liquid friction in those eddies, and there are new collisions of liquid and solid particles throughout the liquid. The resulting deceleration tends to produce more nearly uniform velocities throughout the liquid. There is also a gradual decrease of the rotary motion caused by the tangential feed 17. However, it is possible and often desirable to allow at least part of the superimposed, forward and rotary movements to continue throughout the flow in the mixing and downflow chambers; the baffles 24 may have some stilling effect but it is not necessary or desirable to produce purely laminar forward flow at any point in those two chambers. Coagulation is not promoted by having a very rapid forward flow at one point and a very quiescent flow at another; it is much more important to have some positive or negative increments of velocity throughout the liquid body. The mild and gentle acceleration provided by the air lift is very satisfactory in this connection, and is efficiently supplemented by the numerous, mild decelerations successively caused by the annular baffles spaced throughout the downflow chamber.

In some instances, good coagulation can be secured by passing the liquid through the mixing and coagulating chambers only once; but more often, a recirculation is desirable. In order to provide repeated liquid passages, I provide a lower edge 32 of the inner wall 13 spaced above the tank bottom 12, leaving, between the legs 14, a set of return inlet slots, apertures or flow passages 33. The air lift in the mixing chamber causes part of the flow from the downflow chamber to return inwardly through the slots 33. Thus I have a closed circulation between the chambers 15 and 20. The amount and velocity of this return flow can be controlled by adjusting the width of the slots 33. For this purpose, the lower part of the inner wall 13 may be telescopic, comprising an annular member 34 which slidably engages the stationary portion of the wall, and which can be raised or lowered by rods 35 operated from a platform 36 on the superstructure 26.

The adjustment of the telescopic member 34 may vary from place to place and the vertically adjustable bottom edge 32 may be above or below the bottom edge of the outer drum 23, as shown. However, the outer drum will always surround at least an upper part of the pier 13. The return flow may serve, among other things, to improve the turbulent contact treatment in the mixing and aerating chamber by forming the new coagulates in the presence of some previously formed nuclei, which generally requires the return of some definite amount of solids rather than liquid; or it may be desirable to improve the condition of the pre-formed nuclei or coagulates by partly breaking them up again and rebuilding them with denser structure, which requires a rapid and copious flow of water, as well as the presence of the solids to be reformed. In many instances, this second step of rebuilding the flocs is not required, since good flocs are immediately formed, upon turbulent contact of the raw water with the treating reagents and with some previously formed flocs. In such instances it is only necessary to recirculate some solids, and not a great amount of water, and the volumetric rate of recirculation can be small, especially if the concentration of flocs in the returned water is high. Great improvements over conventional treatments can be provided by recirculating the material so that in the average, the ratio between throughput and total flow in the mixing chamber is about 1 to 1.5 or sometimes up to 1 to 2, or some other ratio in approximately the same range, with generally about 5 to 10 times more solids in every gallon of return liquid than in the mixture formed in the mixing chamber. Sometimes, however, higher volumetric ratios up to 1 to 5 or even more may be resorted to, which of course requires greater consumption of power. In a chemical treatment such high ratios may be used when difficulties are encountered in keeping the bottom of the mixing chamber free from deposits, which are undesirable at this place since they tend to remain indefinitely, to become septic, and to spoil the liquid. In certain biological treatments volumetric ratios of about 1 to 10 or the like may be applied.

Wherever conditions are encountered which require or justify recirculation at a high rate, it may be preferable to resort to mechanical circulating means rather than air lifts. Recirculation may be achieved, for instance, by power driven, stream projecting impellers of ship screw type, or the like, which may be located in the central mixing chamber.

Such high rate circulation, of course, will also cause considerable downward velocities over the bottom of the coagulating chamber. The drum 23 which confines this chamber is spaced above the bottom 12, leaving an annular slot 37, through which the throughput flow passes from the downflow chamber to the subsequent clarifying chamber 38. Where such velocities are contemplated, great care is required in the construction and operation of the tank, due to the great variety of conditions to be taken into account, with solids of different weight, liquids of different viscosities, and the like. It is generally sufficient and always simpler to use ratios such as about 1:1.5, as aforesaid, which are therefore preferred.

The operation may, in some instances, involve the use of hindered sedimentation in the clarification chamber 38. It is preferred, however, so to dimension this chamber as to provide sufficient quiescence for ordinary, complete sedimentation, which inherently is much simpler and safer to control, allows greater flexibility of operation, and results in greater concentration of the sludge, without the use of additional concentrating means.

The preferred form of complete sedimentation is that which is connected with sludge filtration. The annular slot 37, through which the coagulating chamber discharges into the clarifying chamber 38, is ideal in this respect. It provides a bottom inlet into the clarifying chamber; it can be kept submerged in a seal of settled sludge maintained in the central bottom part of the tank; and it forces the flow to pass through a settling sludge blanket, towards the effluent weir 30, launder 39 and take off pipe 40, which are located in the upper and outer part of the tank. This slot or inlet 37 surrounds the mixing, coagulating and recirculating chambers 15, 20 and thus it has relatively substantial length, as compared with the periphery of the conventional central loading well, thereby enforcing sludge filtration over a considerable area and avoiding the formation, and projection into the clarifying chamber, of undesirable eddies. At the same time, the length and arrangement of this inlet is such as to insure substantially equal flow at all points thereof. These features of the clarifying chamber inlet, together with the excellent size and weight of the flocs produced in the mixing, coagulating and recirculating zones, enable me to keep the size of the clarifying chamber down to about the volume of 45 minutes' flow, more or less. The total tank space, then, may be the equivalent of about 1 hour's flow; and frequently the total detention time may be as short as 30 minutes or less, with very good results, where previously in recent and supposedly efficient tanks, about two hours were allowed.

I provide a slowly travelling impeller or sludge scraper 41 horizontally rotating over the bottom 12, with small clearance therefrom. A sump 42 in the bottom 12 receives the sludge which is preferably removed by the scraper 41 from the various points of the bottom at substantially the same rate at which it accumulates, thereby preventing excessive accumulations but maintaining said sludge seal adjacent the slot 37, in well-known manner. For final disposal of the sludge, there is a discharge pipe 43 having its intake in the sump 42.

The sludge impeller 41, which operates in the clarification chamber 38, is carried and rotated by the drum 23 which in turn is driven by means to be described hereafter. This large drum provides a sufficient base and convenient structure for attaching and completing a large, rigid scraper truss, or a plurality thereof. For this purpose, the truss of the scraper 41 may, for instance, be of triangular design, having the top of its inner end secured to the drum 23 by a horizontal hinge 44 adjacent the slot 37. There may be guy wires 45 adjustable by turn-buckles 46 and connecting an outer point of each scraper truss with at least two horizontally spaced points 45—A and 45—B of the drum 23 whereby the trusses are securely held when at rest, and transmit their torque to the drum 23 on rotation.

The sludge impeller 41 may either be a rake, or it may be a plain, radial blade, in which event its rotation can be very slow, avoiding undesirable commotion under the launder 39 and elsewhere. With such a radial sweep, I provide a radial sump 42. In large tanks, where this sump has considerable length, I provide additional sludge impelling means, such as scraper flights 47 operating longitudinally of the sludge sump. The flights may be carried by chains 48 running over sprockets 49 and driven by a mechanism 50 above the water level. The chains 48 may pass vertically between the outer and inner walls, 23 and 13, of the downflow chamber. The scrapers 47 on the chains may have the shape of buckets, and may take concentrated sludge into the coagulating chamber, dumping the same as they are tilted around the upper sprockets 49, whereby some of the most concentrated sludge may be continuously returned to the downflow chamber, avoiding the relatively rapid agitation in the mixing chamber.

The combined scraper drum and coagulator wall 23 may be rotated by a chain 51, engaging an annlar channel member 52 above the supporting ring 29. This chain may be driven, directly or indirectly, by the same mechanism that drives the chain flights 47. For this purpose a vertical-shaft motor (not shown) may drive a horizontal bevel gear 60 and a horizontal sprocket 61. The chain 51 may be directly engaged by the sprocket 61, and protected by the usual take-up device (not shown). The chain 48 of the sump scrapers 47, as shown, is driven through the horizontal bevel gear 60, the vertical bevel gear 62, shaft 63, sprocket 64, chain 65, sprocket 66 and shaft 67 carrying two of the aforementioned sprockets 49.

Various modifications will occur to persons skilled in the art. One modification is suggested in Figure 3. In this embodiment I make use of a mechanical mixing stirrer 53 which rotates at peripheral velocities such as 1 or 2 feet per second, whereby it primarily causes rotary currents in the mixing chamber and in the top part of the downflow chamber. I may provide appreciable vertical flow by tilting the paddles 54 of the mixing stirrer and by providing an inwardly extending baffle 55 adjacent the lower edge 32 of the inner partition 13, whereby the lower end of the inner partition restricts the peripheral zone of relatively high pressure built up on rotation of the stirrer, whereas this liquid pressure is not so restricted adjacent the upper end of the inner partition; at this upper end the liquid pressure in the peripheral zone of liquid rotation is actually increased due to the rotation of paddles in the outer, downflow chamber. Aside from such modified features I generally have the same combined scraper supporting and circulation guiding structure, in the center of this tank, as herein above described. I may furthermore provide the same annular baffles in the downflow chamber, the same manner of sludge removal, and other features of the basic embodiment, shown in Fig. 1. Various features, however, can be omitted or changed without prejudice to the gist of this invention.

I claim:

1. An apparatus for liquid treatment by the formation and removal of sludge, comprising a tank; a bottom in said tank; means for maintaining a liquid level in said tank; an annular partition in said tank, upwardly extending from adjacent but above said bottom to adjacent but below said liquid level, and forming a hollow pier in said tank; legs standing on said bottom and whereon said pier rests, whereby a set of flow passages is formed between said legs; arms mounted on said pier and extending upwardly therefrom, whereby a set of flow passages is formed between said arms; bearing support means horizontally extending above said pier and liquid level and supported by said arms; bearing means supported by said bearing support means concentrically with said pier, in a horizontal plane above said liquid level; a drum member surrounding at least the upper part of said pier, supported by said bearing means, depending therefrom, and extending from above to below said liquid level; means to circulate a flow of liquid through said hollow pier from one to another of said sets of flow passages and back through the space between said drum member and pier; means for feeding liquid to be treated into said flow; means for withdrawing treated liquid from an upper part of said tank outside said drum member; sludge scraper means mounted on and outwardly extending from a lower part of said drum member, adapted to rotate with said drum member and incident to such rotation to collect sludge settled in said tank; means to rotate said drum member and sludge scraper means; and means for withdrawing sludge from a lower part of said tank.

2. An apparatus for liquid treatment according to claim 1, wherein said means to circulate liquid comprises a distributor for compressed air installed within said hollow pier and adapted to circulate liquid upwardly through said hollow pier.

3. An apparatus for liquid treatment according to claim 1, wherein said means to circulate liquid comprises a bladed rotary member installed within said hollow pier.

4. An apparatus for liquid treatment according to claim 1, wherein said means to circulate liquid comprises a central, vertical, rotatable shaft extending through said hollow pier, impeller means on said shaft, at least a part of said impeller means consisting of tilted blade means located within said hollow pier, whereby said impeller is adapted to produce a rotary and rising current when rotated, and means to rotate said shaft.

5. An apparatus for liquid treatment according to claim 1, wherein said means for withdrawing sludge comprises a sump in said bottom, said sludge scraper means being adapted to shift the settled sludge into said sump.

6. An apparatus for liquid treatment according to claim 1, comprising a sump in said bottom and additional sludge scraper means adapted to move sludge from said sump into said flow, said first-mentioned sludge scraper means being adapted to shift settled sludge into said sump.

7. An apparatus for liquid treatment according to claim 1, comprising annular baffles secured to the inside of said drum member, bracing the same.

FRANK D. PRAGER.